United States Patent [19]

Takeda et al.

[11] Patent Number: 5,796,190
[45] Date of Patent: *Aug. 18, 1998

[54] ENGINE-DRIVEN PERMANENT MAGNETIC TYPE WELDING GENERATOR

[75] Inventors: Masanobu Takeda; Yasumasa Mizuno; Shunichi Tetsui; Hirotaka Yamamoto, all of Kawagoe, Japan

[73] Assignee: Denyo Kabushiki Kaisha, Tokyo-To, Japan

[*] Notice: This patent issued on a continued prosecution application filed under 37 CFR 1.53(d), and is subject to the twenty year patent term provisions of 35 U.S.C. 154(a)(2).

[21] Appl. No.: 655,026

[22] Filed: May 29, 1996

[30] Foreign Application Priority Data

May 29, 1995 [JP] Japan .................... 7-130486
May 29, 1995 [JP] Japan .................... 7-130488
May 29, 1995 [JP] Japan .................... 7-130553

[51] Int. Cl.[6] ............... H02K 21/22; H02K 1/04; H02K 1/22
[52] U.S. Cl. ............... 310/58; 310/216; 310/254; 310/261; 310/156; 310/61; 310/112; 310/271
[58] Field of Search .................... 310/254, 216, 310/261, 58, 61, 179, 156, 112

[56] References Cited

U.S. PATENT DOCUMENTS 2,689,394  12/1954  Brown .................... 310/112
4,286,187   8/1981  Binder ................... 310/112
4,642,502   2/1987  Carpenter et al. ......... 310/156
4,797,602   1/1989  West ..................... 310/156

Primary Examiner—Thomas M. Dougherty
Assistant Examiner—K. Tamai
Attorney, Agent, or Firm—Jacobson, Price, Holman, Stern, PLLC

[57] ABSTRACT

Disclosed is an engine-driven welding generator using a plurality of neodymium-iron-boron based rare earth magnets and provided with countermeasures for suppressing a rise in temperature of the magnets. The engine-driven welding generator driven by an engine (200) to generate both a dc welding power output and an auxiliary ac power output comprises: a stator (110) including a laminated-structure armature core (111) and an armature winding (112) wound around the armature core (111); a rotor (120) supported by the engine in cantilever fashion and including a laminated-structure field core (121), a plurality of magnet plates (122) containing neodymium-iron-boron based rare earth as the major component and arranged on an outer circumferential surface of the laminated-structure field core with a smallest possible gap between the two adjacent magnet plates, a plurality of centrifugal fan blades (123) arranged in the vicinity of the outer circumference of and on both side surfaces of the field core, and a plurality of axial air passages (121a) formed on an inner side of the field core; and an enclosure including a housing (101) fixed to the engine for supporting the stator, and a top cover (103) for introducing cooling air from one side surface of the rotor remote from the engine through the fan-shaped air passages formed in the rotor core in cooperation with the housing.

3 Claims, 12 Drawing Sheets

A-A  B-B

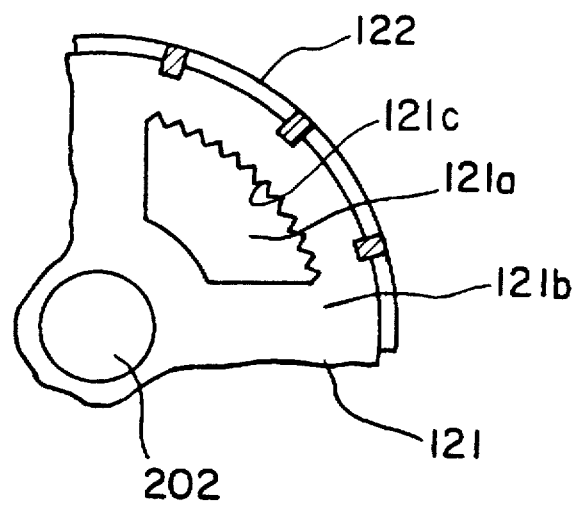
F I G. 15

ENGINE-DRIVEN PERMANENT MAGNETIC TYPE WELDING GENERATOR

BACKGROUND OF THE INVENTION

The present invention relates to an engine-driven permanent magnet type welding generator, and more specifically to a welding generator provided with a rotating magnetic field system constructed by use of permanent magnets.

When welding work is conducted in the open air, in general a portable-type engine-driven welding machine assembled with an electric generator is widely used. This is because in the environment where a power source is difficult to obtain as with the case of the open air, it is necessary to supply a power source not only to the welding welder but also to some other apparatus (e.g., machining apparatus and illumination apparatus).

Therefore, the welding generator constructed as a synchronous generator of rotating magnetic field type is widely used together with the welding machine, to supply an auxiliary power in addition to a welding power.

In the case of the welding generator of this type, since an auxiliary power source of commercial power frequency is required according to the number of engine revolutions, the welding generator is constructed in such a way that the number of poles is two, the revolution speed thereof is 3600 rpm, and the frequency is 60 Hz, or else that the number of poles is four, the revolution speed thereof is 1800 rpm, and the frequency is 60 Hz. On the other hand, the welding power is outputted as a dc arc welding output obtained by full-wave rectifying three-phase ac output.

As the result that the rotating magnetic field system is obtained by use of two or four poles, when a welding generator 1 and an engine 2 both shown in FIG. 16 are coupled with each other, the size of the welding machine provided with the welding generator inevitably increases. For instance, where a generator is provided with a 150A-class welding machine, the diameter of the rotor core becomes as large as 140 mm and the thickness of the stacked rotor core becomes as thick as about 60 mm. Therefore, after a field winding is wound around the core and further an armature winding is wound around a stator, the total axial length of the welding generator (between both the coil ends) is as long as 120 mm or more. Here, the reason why the size of the welding generator becomes large is that it is necessary to cope with the problem with respect to a rise in temperature caused by the magnetic field winding wound around the rotor. When the size of the welding generator becomes large, since the welding generator is lack of portability, a small-sized and light-weight welding generator usable with the welding machine has been so far needed.

However, when the welding generator is provided with both the magnetic field winding and the armature winding, the temperature within the welding generator tends to rise due to heat generated by both the windings, with the result that the resistance values of the windings increase. Therefore, it has been impossible to reduce the size of the generator, as far as a construction suitable to effectively radiate heat of the two windings cannot be adopted.

For the reason as described above, a basic improvement such that a permanent magnet is used instead of the field winding has been so far required in the field of the portable welding generator.

Here, when considering the field system of a motor having parts or elements usable in common as those of a generator (i.e., the motor and generator are both used as electric rotating machines), permanent-magnetic type motors each having a rotating field system generated by a permanent magnet are widely now on sale, in order to solve a rise in temperature due to heat generated by the field winding. Further, in this case, a rare earth magnet, in particular a samarium-cobalt based magnet is widely used to obtain higher magnetic characteristics.

In the samarium-cobalt based magnet, since the magnetic characteristics are sufficiently excellent, there arises no problem, as far as the magnet is used when a steady output is generated as with the case of the motor or the ordinary generator.

In contrast with this, a problem arises in the field of the welding generator. In more detail, in the welding work, since the short-circuit and open-circuit are often repeated, a large reaction magnetic field is inevitably generated. In addition, there exist other problems caused by the vibrations transmitted from the engine (a driving source), the intermittent operation of about 10-min period (which is peculiar to the welding machine), the braking and vibrations due to the repeated large current short-open operation under a non-steady current load, etc. Therefore, a large mechanical strength is required for the permanent magnet.

A practical experiment indicated that the strength of the samarium-cobalt based rare earth magnet is not sufficient when used for the welding generator, with the result that the magnet is easily damaged or broken.

To overcome this problem, a neodymium-iron-boron based rare earth magnetic excellent in mechanical strength has been studied as a rare earth magnet other than the samarium-cobalt rare earth magnet. In other words, a permanent magnetic type welding generator having the neodymium-iron-boron based rare earth magnet arranged on an outer circumferential surface of a rotor as the field magnet has been developed.

In the case where the neodymium-iron-boron based rare earth magnet is used for the welding generator, in order to cool the rotor magnet and to reduce the size and weight of the welding generator, it is preferable to support the engine in cantilever fashion and to introduce cooling air from a surface of the generator housing remote from the engine.

When the welding generator is supported by an engine shaft in cantilever fashion, it is necessary to secure the centering or alignment between the welding generator and the engine by determining a length of a faucet (or spigot) portion of a housing to be relatively long. In this case, in order to entirely fit the stator core to the faucet portion of the housing, it is necessary to determine the contact area between the housing and the stator core to be broad so that the fitting tolerance between both can be loosened. Otherwise, the fastening work and alignment work of both the stator core and the housing become difficult, so that a precise centering between the engine and the generator is difficult to achieve. As a result, the magnetic gap inevitably increases, with the result that the size of the generator tends to be increased.

On the other hand, however, the characteristics between the temperature and the demagnetization rate of the neodymium-iron-boron based rare earth magnet (Pc=1 shown in FIG. 17) are not excellent as compared with those (Pc=2 shown in FIG. 17) of the samarium-cobalt based rare earth magnet. Therefore, in the case where the welding generator temperature rises as high as 100° C. by the heat conducted and radiated by the engine as with the case of the engine-driven welding generator, a problem has been confirmed in that the magnetization characteristics of the permanent magnet cannot be restored. To overcome this problem, therefore, it is necessary to cool the inside of the generator housing sufficiently.

SUMMARY OF THE INVENTION

With these problems in mind, therefore, it is a first object of the present invention to provide a structure for mounting a stator of a permanent magnet type generator, in which a faucet portion is formed in a housing to allow a stator to be centered with and mounted within the housing accurately and further which can reduce the size of the welding generator and facilitate the assembly work thereof.

Further, a second object of the present invention is to provide an engine-driven welding generator, which can use a neodymium-iron-boron based rare earth magnet without increasing the generator temperature.

Further, a third object of the present invention is to provide an engine-driven permanent magnet type generator, which can remove the heat generated by the internal elements (an armature winding, in particular) of the welding generator effectively and further shut off heat conducted from the engine as much as possible, so that the permanent magnet having the unsatisfactory temperature characteristics can be adopted to form the magnetic field system.

To achieve the above-mentioned objects, the present invention provides a structure for mounting a stator (110) of a permanent magnet type generator (100), the stator being arranged on an outer circumference of a rotor (120) having a permanent magnet type field system and driven by an engine (200), and an armature winding (112) being wound around the stator, which comprises: a housing (101) formed with a circular faucet portion (101c) for fitting the stator into an inner circumferential surface thereof and supported by the engine in cantilever fashion to house the stator (110) and the rotor (120) therewithin; and wherein: the stator is formed into a roughly square shape in an outer circumference thereof and formed with a plurality of armature winding grooves (111a) in an inner circumference thereof, the stator (110) being composed of at least three blocks (111A, 111B, 111C), each block being constructed by laminating roughly square-shaped sheet metal cores each formed with two pairs of outer circumferential straight portions (111b) arranged in right-angle positional relationship with respect to each other and with outer circumferential circular arc-shaped portions (111f) for connecting the outer circumferential straight portions (111b) mutually, the three blocks being stacked upon each other in such a way that a second block (111B) is sandwiched between first and third blocks (111A and 111C) by overturning only the third block (111C) inside out and further by rotating only the second block (111B) by a predetermined angle so that radially projecting and recessed portions (111b, 111f) are arranged alternately on both side surfaces of the stacked blocks, respectively; and the radially projecting portions (111f) of the stator (110) are first brought into contact with the faucet portion (101c) formed in the housing (101) and further pressure-fitted thereinto to fix the stator (110) to the housing (101).

Further, the structure further comprises a top cover (103) fixed to the stator (110) on a side remote from the housing (101).

Further, the present invention provides an engine-driven permanent magnet type generator, which comprises: a stator (110) including: an armature core (111); and an armature winding (112) wound around the armature core, a ratio of a coil end length of the armature winding from one side of the armature core to a thickness of the armature core being about 1:1; a rotor (120) including: a field core (121) fixed to an engine rotary shaft (202) and supported by an engine in cantilever fashion so as to be located at a central position of the stator (110), a thickness of the field core being equivalent to that of the armature core, the field core being formed with a cross sectional area effective for field magnet flux in an outer circumferential portion thereof and with a plurality of axial fan-shaped air passages (121a) in an inner circumferential portion thereof; a plurality of magnet plates (122) each formed into roughly square shape and arranged on an outer circumferential surface of the field core (121), the number of the magnet plates being the same as the number of field poles of the field core; and a plurality of centrifugal fan blades (123) arranged in the vicinity of an outer circumference of and on both side surfaces of the field core, for ventilating cooling air in radial direction of the stator; and an enclosure including: a housing (101) fixed to the engine, for supporting the stator; and a top cover (103) formed with a plurality of air passages (103a, 103b) for introducing cooling air from one side surface of the rotor remote from the engine through the fan-shaped air passages (121a) formed in the rotor core in cooperation with the housing (101).

Further, in the engine-driven permanent magnet type generator, the top cover (103) is formed with a cylindrical air introducing portion (103e) for regulating air flow path caused by the centrifugal fan blades (123).

Further, the present invention provides an engine-driven welding generator driven by an engine to generate a welding power output and an auxiliary power output, which comprises: a stator (110), including: a laminated-structure armature core (111); and an armature winding (112) wound around the armature core; a rotor (120) supported by the engine in cantilever fashion, including: a laminated-structure field core (121); a plurality of magnet plates (122) containing neodymium-iron-boron based rare earth as the major component and arranged on an outer circumferential surface of the laminated-structure field core with a smallest possible gap between the two adjacent magnet plates; a plurality of centrifugal fan blades (123) arranged in the vicinity of the outer circumference of and on both side surfaces of the field core; and a plurality of axial air passages (121a) formed on an inner circumferential side of the field core; and an enclosure including: a housing (101) fixed to the engine, for supporting the stator; and a top cover (103) formed with a plurality of air passages (103a, 103b) for introducing cooling air from one side surface of the rotor remote from the engine through the fan-shaped air passages (121a) formed in the rotor core in cooperation with the housing (101).

Further, in the engine-driven welding generator, two generators (100) each composed of the stator and the rotor are coupled to the engine on both axial sides of the engine (200), respectively to generate a power output by synthesizing two power outputs of the two welding generators.

BRIEF DESCRIPTION OF THE DRAWINGS

FIG. 15 is a partial plane view showing a modification of the rotor (i.e., field) core of the welding generator according to the present invention;

DETAILED DESCRIPTION OF THE PREFERRED EMBODIMENTS

Figure 1:
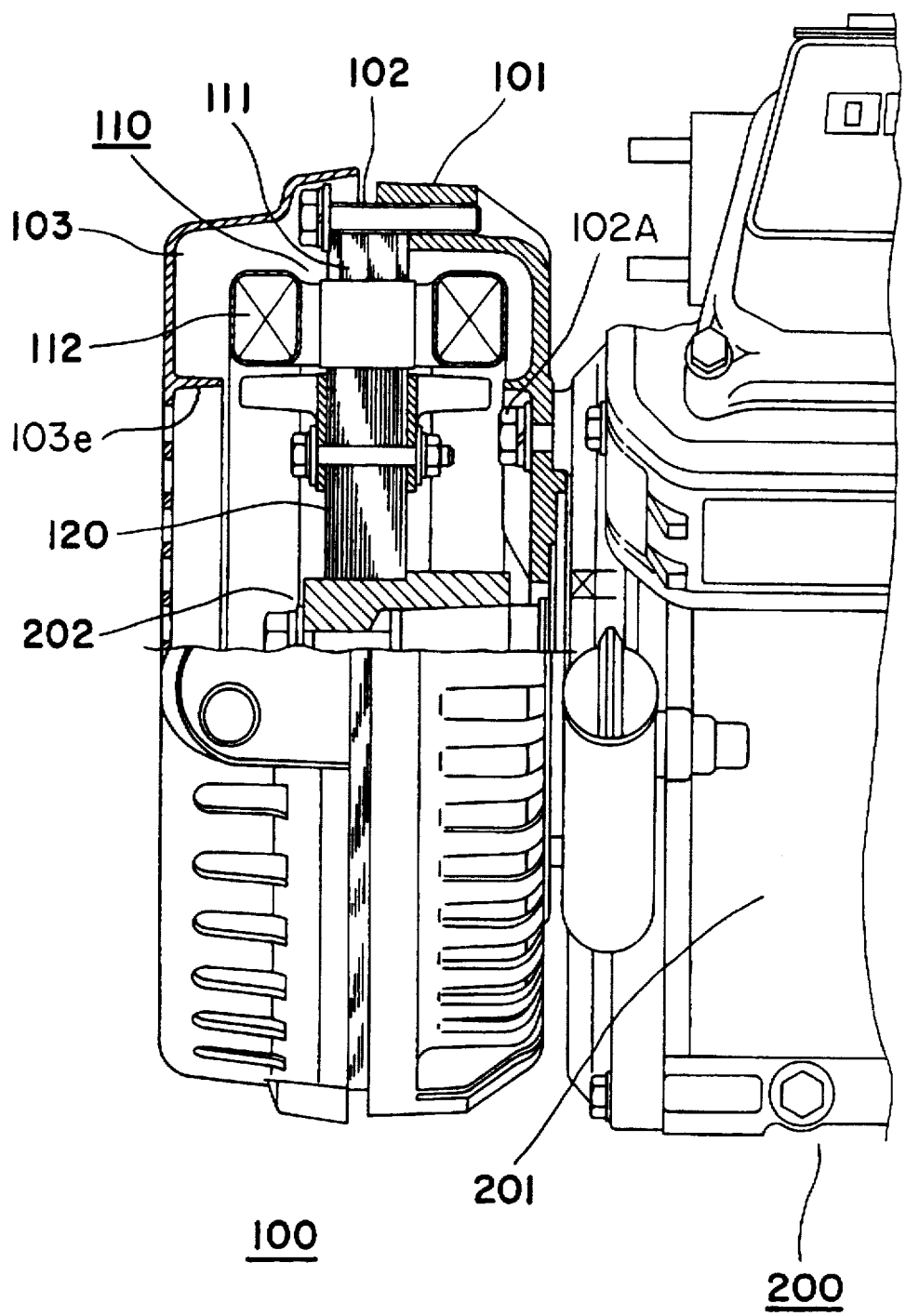
FIG. 1 is a longitudinal cross-sectional, partly broken view showing a first embodiment of the welding generator according to the present invention.

FIG. 1 shows a first embodiment of the welding generator according to the present invention. In FIG. 1, a welding generator 100 of permanent magnet type is driven by an engine 200 to output a welding electric power and an auxiliary electric power. The welding generator 100 is composed mainly of a stator 110 fixed to a housing 101 mounted on an end surface of an engine body 201 by use of through bolts 102, and a rotor 120 fixed to an engine output shaft 202. Further, a top cover 103 is attached to an open surface side of the housing 101 to form an enclosure in cooperation with the housing.

The stator 110 includes a stator core (i.e., an armature core) 111 and an armature winding 112. On the other hand, the rotor 120 is of permanent-magnet rotating field system type. The rotor 120 includes a plurality of rare earth magnets (not shown in FIG. 1) arranged in and fixed to an outer circumferential surface thereof so as to form field magnetic poles, and a plurality of cooling fan blades arranged on both side surfaces and in the vicinity of the outer circumference thereof.

Figure 2A:
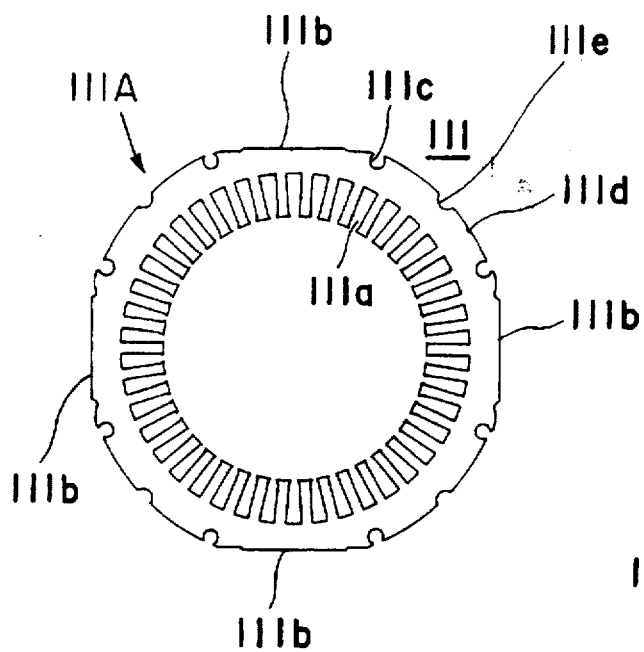
FIGS. 2(a), 2(b) and 2(c) are plane views showing three sheet core blocks for constituting a stator (i.e., armature) core shown in FIG. 1, respectively.
Figure 2B:
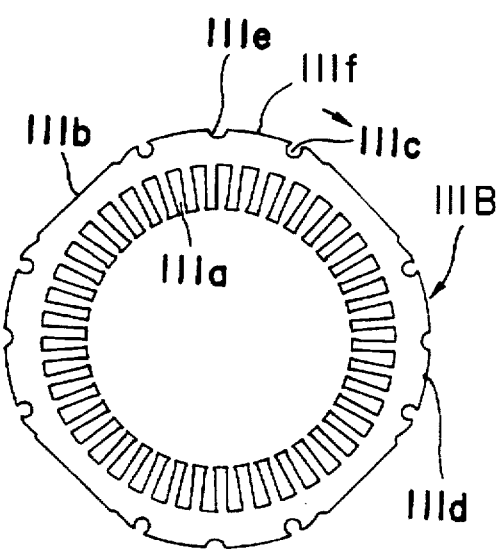
Figure 2C:
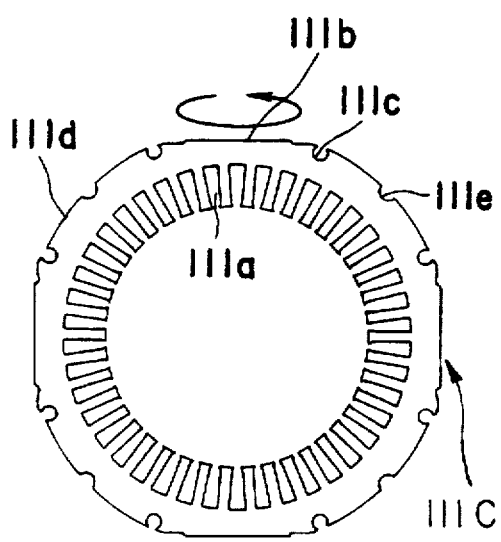

FIGS. 2(a), 2(b) and 2(c) show the side surface shapes of three (first, second and third) sheet core blocks 111A, 111B and 111C for constituting the stator core 111 shown in FIG. 1. Although the thicknesses of these sheet core blocks are different from each other, each of the sheet core blocks is formed as a laminated structure. Further, FIGS. 2(a) and 2(c) show two (first and third) sheet core blocks 111A and 111C each having a thinner plate thickness and arranged on both sides (in the thickness-direction) of the stator core 111, and FIG. 2(b) shows a (second) sheet core block 111B having a thicker plate thickness and arranged at the middle portion of the stator core 111 being sandwiched between the two thinner sheet core blocks 111A and 111C.

Here, the two thinner sheet core blocks 111A and 111C as shown in FIGS. 2(a) and 2(b) are formed by laminating several sheet metal cores, for instance; and the thicker sheet core block 111B as shown in FIG. 2(c) is formed by laminating sheet metal cores whose number is several times larger than that of the thinner sheet core block 111A or 111C, for instance.

The respective sheet metal cores are punched out from a steel plate into the same shape, in such a way that the entire outer shape thereof becomes roughly square and a central circular hole for inserting the rotor 120 is formed at the central portion thereof. Further, a plurality of recessed portions (described later in further detail) are formed in the outer circumference of each sheet metal core, and a plurality of radially extending inner armature winding grooves 111a for inserting the armature winding 112 are formed on an inner circumference (i.e., the outer circumference of the central hole) of each sheet metal core at regular angular intervals.

Further, the outer circumference of each sheet metal core is formed into roughly a square shape by forming two pairs of two straight portions 111b arranged in right-angle positional relationship with respect to each other. In addition, eight through bolt holes 111c are formed in such a way as to be located at the same positions when both the surfaces of the respective sheet metal cores are overturned inside out. Further, a reversal mark 111d is formed as a mark for indicating the overturned sheet metal core. Further, four recessed welded portions 111e are formed at regular angular intervals along the outer circumference of each sheet metal core.

By use of the above-mentioned sheet metal cores, the two (first and third) thinner sheet core blocks 111A and 111C as shown in FIGS. 2(a) and 2(c) and one (second) thicker sheet core block 111B as shown in FIG. 2(b) can be formed, separately. After that, the three sheet core blocks are stacked upon each other in such a way that the second sheet core block 111B can be sandwiched between the first and third core blocks 111A and 111C by overturning only the third core block 111C inside out and further by rotating only the second block by a predetermined angle (e.g., 45 degrees) so that all the armature winding grooves 111a of these three sheet core blocks can be located at the same positions (i.e., the grooves can be overlapped with each other).

Figures 3A, 3B:
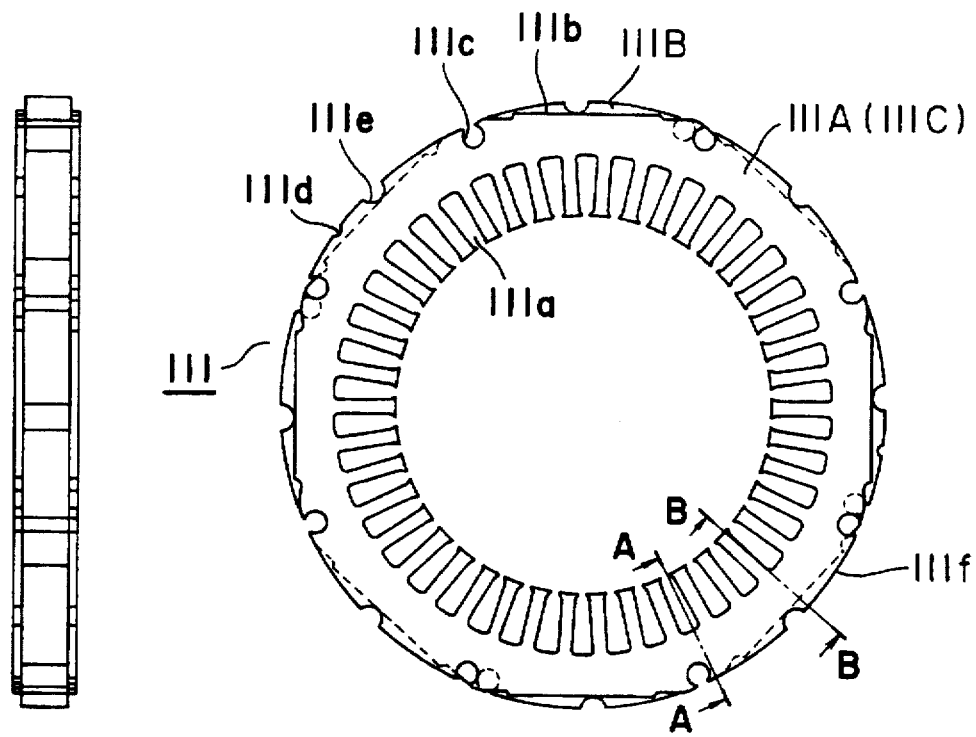
FIGS. 3(a) and 3(b) are plane and side views showing the three stacked sheet core blocks shown in FIGS. 2(a), 2(b) and 2(c), respectively.

FIGS. 3(a) and 3(b) show the state where the three sheet core blocks 111A, 111B and 111C are all stacked upon each other. As shown, these three sheet core blocks are stacked in such a way that the straight portions of the sheet core blocks appear at different angular positions between the middle portion (i.e., the second block) and both side end (in the thickness direction) portions (i.e., the first and third blocks) of the stator (i.e., armature) core 111 along the circumferential surface thereof. As a result, as shown in FIG. 3(a), the circular arc shaped portions 111f of the second sheet core block 111B project radially outward from the straight portions 111b of the first and third sheet core blocks 111A and 111C at four (i.e., upper, lower, right and left) different angular positions. On the other hand, the circular arc shaped portions 111f of the first and third sheet core block 111A and 111C project radially outward from the straight portions 111b of the second sheet core blocks 111B at four different angular positions 45 degrees away from the upper, lower, right and left angular positions. Consequently, the outer circumferential surface of the assembled sheet core blocks (i.e., the stator core 111) is formed into convex and concave shapes. As described later, some of these convex portions thereof are used as guides for centering the stator core with respect to the housing, and the other of these convex portions thereof are used to fix the top cover to the stator core.

Figures 4A, 4B:
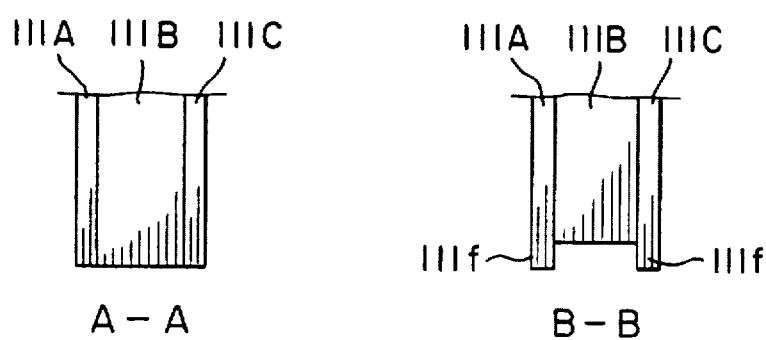
FIGS. 4(a) and 4(b) are partial cross-sectional views taken along the lines A—A and B—B in FIG. 3(a), respectively.

FIGS. 4(a), and 4(b) are cross-sectional views taken along the lines A—A and B—B in FIG. 3(a). As understood by these drawings, the outer circumferential surface of the stator or armature core 111 is radially flat at the cross section along the line A—A, but projects radially outward at the cross section along the line B—B. Further, the outer circumferential surface of the stator core 111 is radially recessed inward at the other cross section (not shown).

Figure 5:
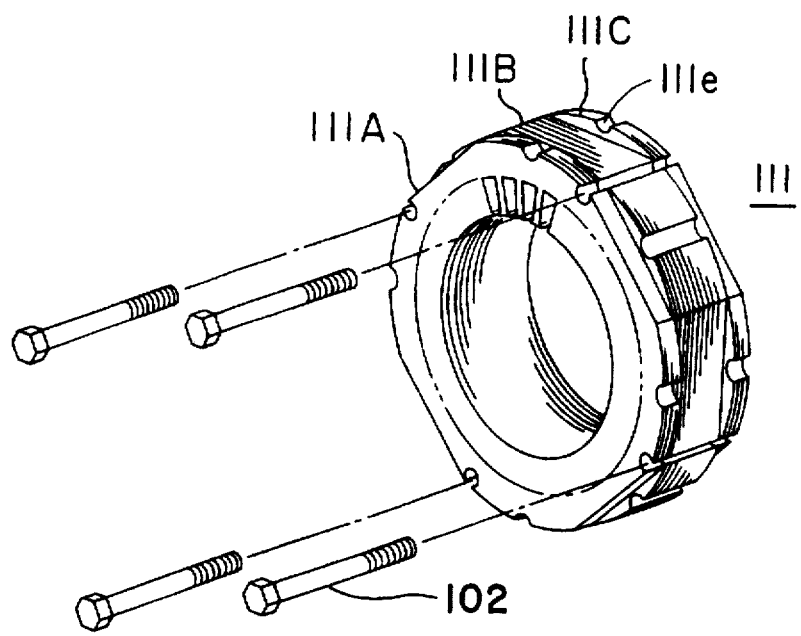
FIG. 5 is a perspective view showing the state where a stator core 111 as shown in FIGS. 2 and 4 is fixed to a housing 101 by use of four through bolts 102.

FIG. 5 is a perspective view showing the state where the stator core 111 shown in FIGS. 2 and 4 is fixed to the housing 101 by use of the four through bolts 102. As understood by FIG. 5, the respective sheet core blocks 111A, 111B and 111c are assembled in such a way that the outer circumferential surface of the stator core 111 is formed into convex and concave shape; that is, the flat portions and circular arc portions are arranged alternately along the outer circumferential direction and in the axial directions. Further, the respective sheet core blocks are fixed one another strongly at the eight recessed welding portions 111e thereof. Therefore, when seen in the axial direction of the stator core 111, the projection shape of the outer circumference of the stator core 111 is formed into roughly a circular doughnut shape.

Figure 6:
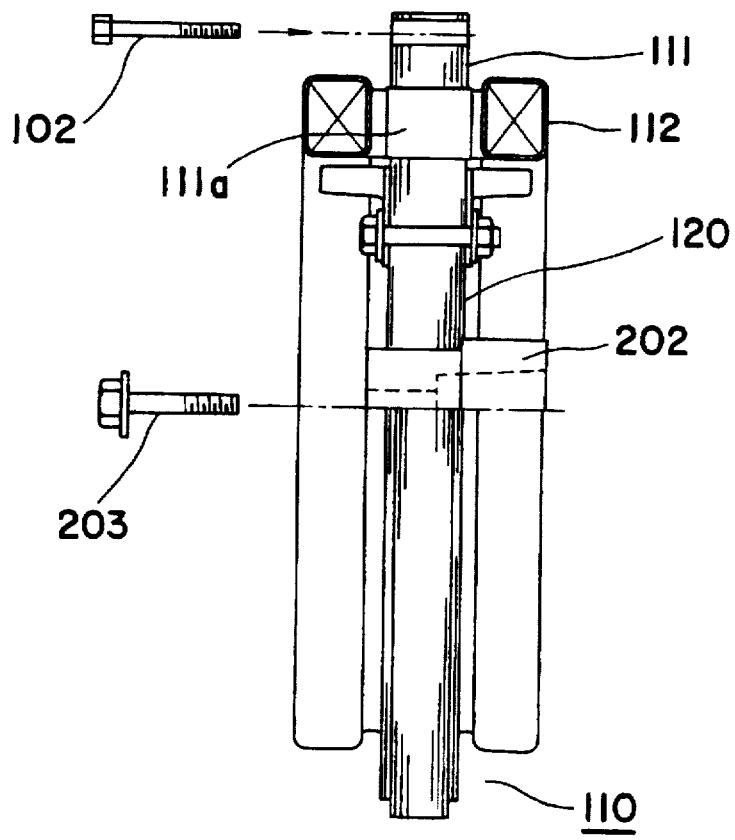
FIG. 6 is a side, partial cross-sectional view showing the state where a stator 101 and a rotor 120 are assembled with each other.

FIG. 6 is a partial longitudinal view showing the state where the stator 110 is assembled with the rotor 120. In FIG. 6, the stator 110 is fixed to the housing (not shown) by use of the four through bolts 102, and the stator (armature) winding 112 is wound around the armature winding grooves 111a of the stator core 111 of the stator 110.

Figure 7A:
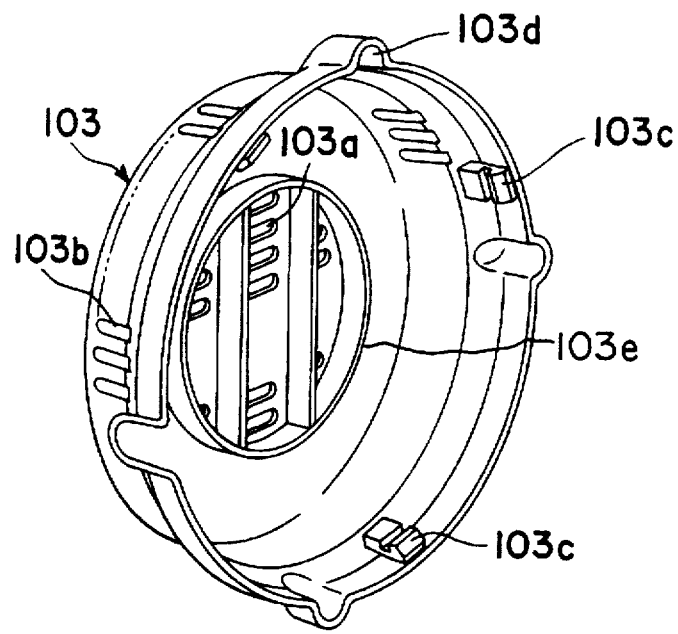
FIGS. 7(a) and 7(b) are perspective views showing a fixing structure of a top cover 103 to a stator (i.e., armature) core 111.
Figure 7B:
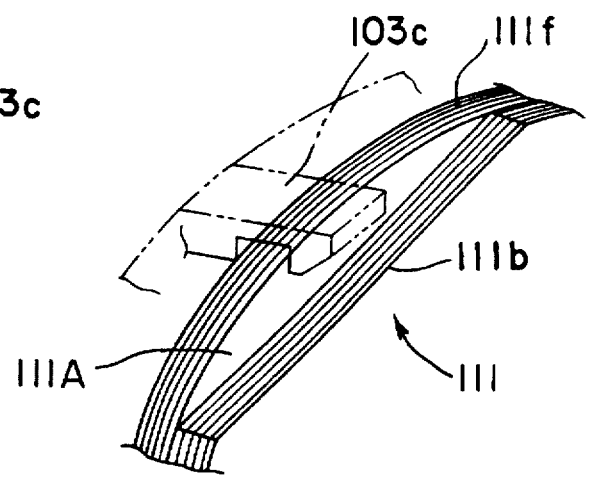
Figure 8A:
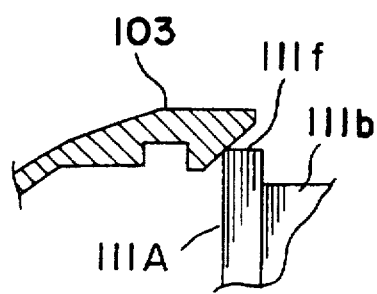
FIGS. 8(a) and 8(b) are partial cross-sectional views showing two fixing steps of the top cover 103 to the stator (i.e., armature) core 111.
Figure 8B:
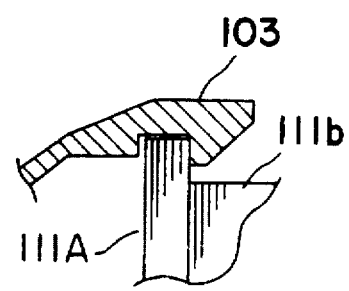

FIGS. 7(a) and 7(b) are perspective views showing the fixing structure of the top cover 103 to the stator core 111. In the outer circumference of the stator core 111, as already explained with reference to FIGS. 3(a) and 3(b) and FIG. 4(b), the four radially-projecting circular arc shaped portions 111f of the sheet core 111 are formed on both side surfaces of the assembled stator core 111. On the other hand, four engage claws 103c as shown in FIG. 7 are formed in the inner circumference of the top cover 103 on the open end side so as to be engaged with these four radially-projecting circular arc shaped portions 111f of the stator core 111. Therefore, when the top cover 103 is pushed against the stator core 111, the four engage claws 103c are shifted from the position as shown in FIG. 8(a) to the position as shown in FIG. 8(b), so that the engage claws 103c of the top cover 103 can be engaged with the radially projecting portions 111f of the stator core 111 and thereby the top cover 103 can be fixed to the stator core 111.

Further, the top cover 103 is formed with air inlet holes 103a in the side surface remote from the engine, and air outlet holes 103b formed in the outer circumferential surface thereof, both in order to emit heat generated by the stator 110 and to prevent heat conducted to the rotor 120. Further, the top cover 103 is formed with four projections 103d along the circumferential surface thereof and on the engine side surface, to cover the four through bolts 102.

Figure 9:
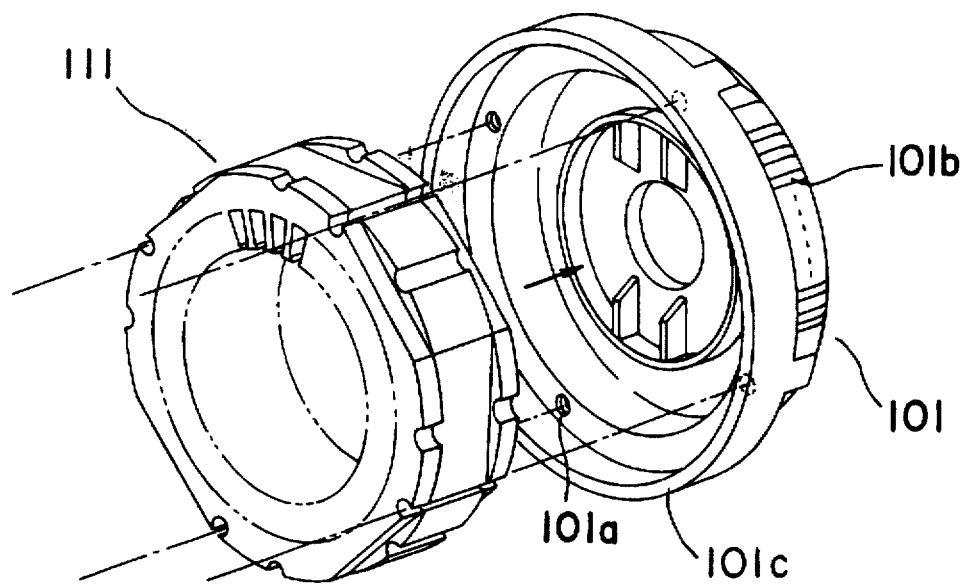
FIG. 9 is a perspective views showing a structure for fixing both the stator core 111 and the housing 101 to an engine (not shown)
Figure 10:
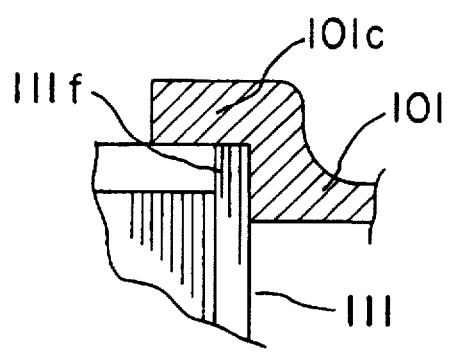
FIG. 10 is a partial cross-sectional views showing the structure for fixing both the stator core 111 and the housing 101 to the engine (not shown)

FIG. 9 shows the structure for fixing both the stator core 111 and the housing 101 to the engine (not shown), and FIG. 10 shows the fixed state of both. First, the housing 101 is fixed to the engine by use of some mounting bolts 102A (See FIG. 1). After that, the stator core 111 is fixed to the housing 101 by fitting the outer circumferential surface of the stator core 111 into an inner circumferential surface of a faucet (or spigot) portion 101c of the housing 101 on the open side thereof, as shown in FIG. 10 and further by fastening the four through bolts 102 into the housing 101. In more detail, the radially projecting portions 111f formed on both sides of the stator core 111 are brought into contact with the circular faucet portion 101c formed on the open side surface of the housing 101, and then pressure-fitted into the deepest position of the faucet portion 101c by fastening the four through bolts 102. In this case, the thin and radially projecting portions 111f of the end sheet core block 111A or 111B of the stator core 111 can function as guide members, and after that the stator core 111 is guided to the deepest position of the housing 101 together with the middle radially projection portions 111f of the middle sheet core block 111B. In this case, since the shape of the outer circumferential surface of the stator core 111 is of circular shape, the stator core 111 can be guided deep into the housing 101 smoothly. As described above, since the stator core 111 can be centered or aligned with the housing 101 by guiding the stator core 111 into the deepest portion of the housing 101, it is necessary to decide the depth of the faucet portion 101c of the housing 101 to some extend, for instance to a depth half of the thickness of the stator core 111.

Further, the housing 101 is formed with air outlet holes 101b on the outer circumference thereof in order to exhaust cooling air in cooperation with the air outlet holes 103b formed in the top cover 103.

In the construction as described above, since the stator core 111 can be first brought into contact with the faucet portion 101c of the housing 101 and then pressure-fitted into and strongly fixed to the deepest position of the faucet portion 101c of the housing 101, on the basis of the guide function of the radially projecting portions 111f formed on both the side surfaces of the stator core 111 formed by stacking at least three core blocks 111A, 111B and 111C, it is possible to center or align the stator core 111 at the central position of the housing 101 accurately. As a result, since the magnetic gap between the stator 110 and the rotor 120 can be minimized and thereby the magnetic efficiency can be improved, it is possible to provide a welding generator of high performance, in spite of the relatively small size thereof. In addition, since the engage claws 103c of the top cover 103 can be engaged with the radially projecting portions 111f formed on one side surface of the stator core 111, it is possible to fix the top cover 103 to the stator 111 easily.

Figure 11:
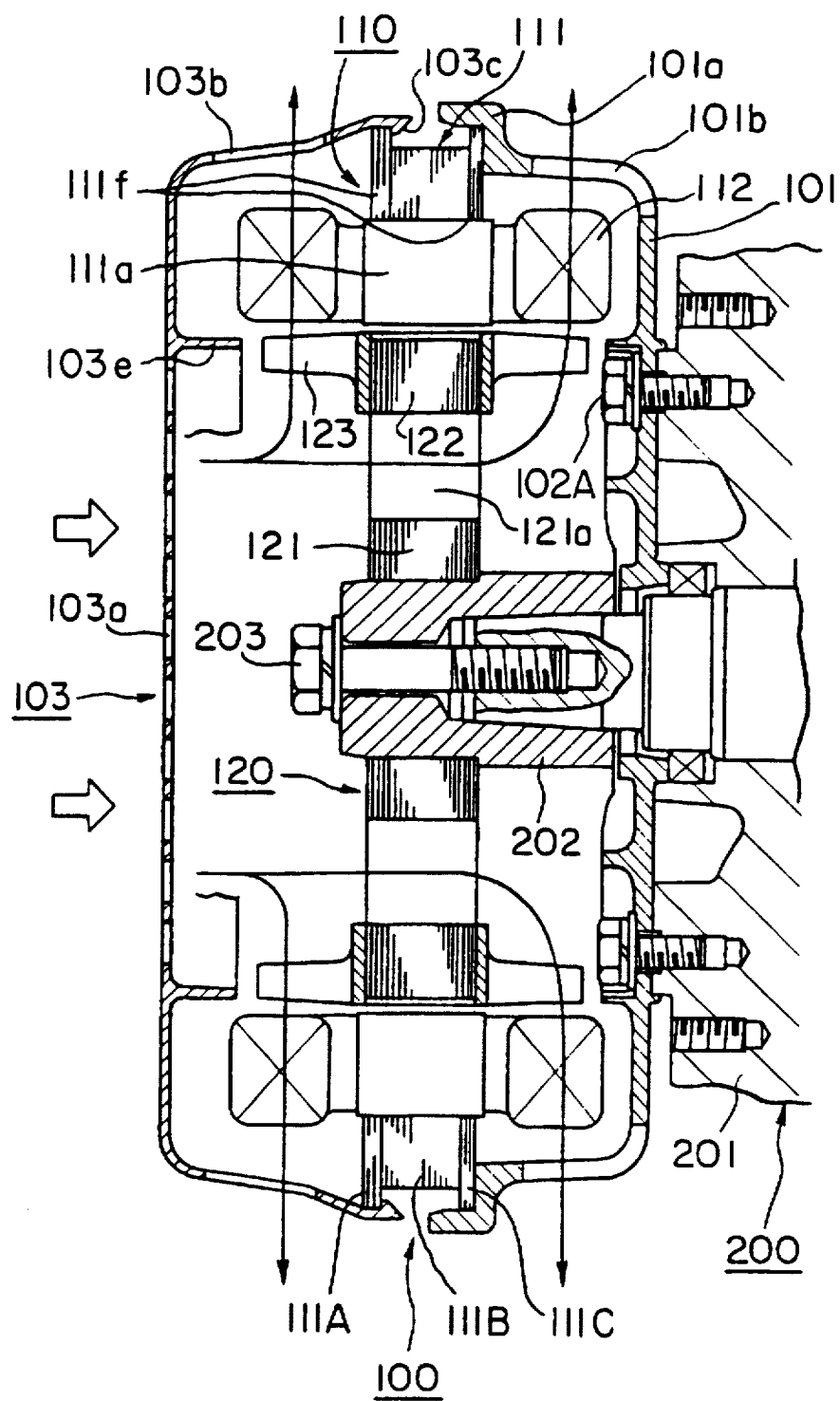
FIG. 11 is a longitudinal cross-sectional view showing a second embodiment of the welding generator according to the present invention.

FIG. 11 shows a second embodiment of the welding generator according to the present invention. In this second embodiment, the engine-driven welding generator 100 is supported by an output shaft 202 of an engine 200 in cantilever fashion, and the stator 110 is supported by the housing 101 by use of the radially projecting portions 111f of the stator core 111, without use of any through bolts 102. In more detail, the welding generator 100 is mainly composed of the stator 110 and the rotor 120. The housing 101 is fixed to the output shaft side surface of the engine body 201 by use of bolts 102A. The stator 110 is fixed to the housing 101 by use of the engagement of the radially projecting portions 111f of the stator core 111 with the inner circumferential surface of the housing 101. Further, the rotor 120 is fixed to the output shaft 202 of the engine 200 by use of a single bolt 203. Further, the top cover 103 is attached to an open surface side of the housing 101.

As described later, the stator 110 includes the stator core (i.e., an armature core) 111 and the armature winding 112. An electric power generated by the armature winding 112 is outputted, after the frequency thereof has been converted by an inverter (not shown). The armature core 111 is formed with the radially-projecting portions 111f along the outer circumference thereof and on both side surfaces thereof. The radially-projecting portions 111f formed on one side surface (the left side in FIG. 11) of the stator core 111 are engaged with the top cover 102, and the radially-projecting portions 111f formed on the other side surface (the right side in FIG. 11) of the stator core 111 are engaged with the housing 101. In other words, the stator core 111 are fixed to both the top cover 103 and the housing 101, respectively on the basis of the engagement of these radially-projecting portions 111f of the sheet core blocks 111A and 111C. On the other hand, a plurality of armature winding grooves 111a are formed in the inner circumferential surface of the armature core 111 to wind the armature winding 112 therearound.

Figure 12:
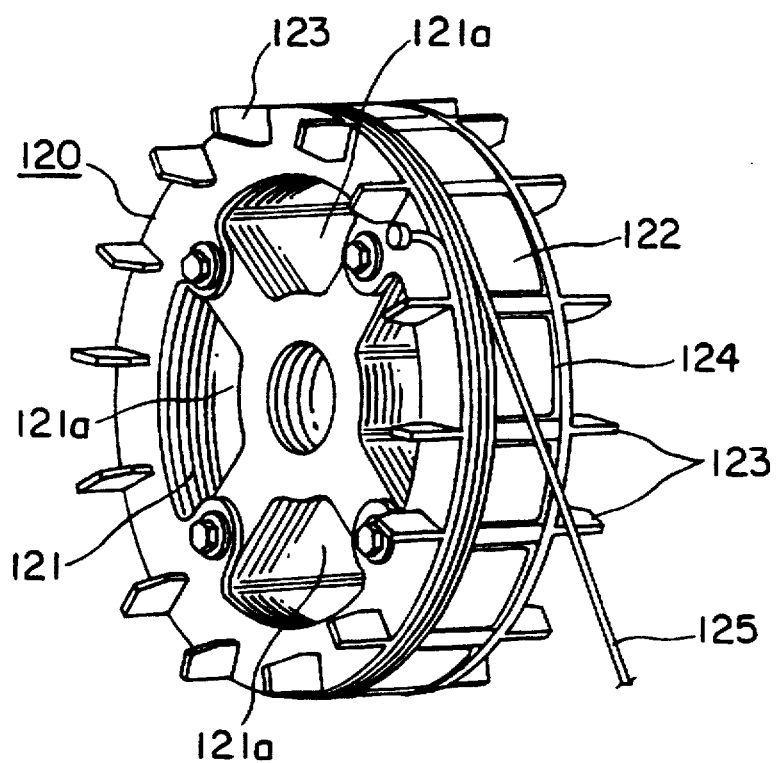
FIG. 12 is a perspective view showing the state where the rotor used for the second embodiment shown in FIG. 11 is almost completed.

In the rotor 120, as shown in FIG. 12, a plurality of rare earth magnetic plates 122 are arranged and fixed along the outer circumferential surface of the rotor (i.e., field) core 121 so as to form a plurality of magnetic field poles. In addition, a plurality of centrifugal cooling fan blades 123 are provided on both the side surfaces and in the vicinity of the outermost circumference portion of the rotor or field core 121. Therefore, the rotor 120 can generate a rotating magnetic field by permanent magnets. Further, the field core 121 is formed with four fan-shaped (in cross section) air passages 121a in the thickness or axial direction thereof. In other words, the outer circumferential portion of the field core 121 is connected to the inner circumferential portion thereof by four spokes formed between the two adjacent fan-shaped air passages 121a. Further, the inner circumferential surface of the rotor 120 is fixed to the engine output shaft 202 by use of the bolt 203, as shown in FIG. 11.

Here, an important problem is how to decide the number of poles of the rare earth magnetic plates 122 of the rotor 120, under due consideration of the following three points: (1) the magnetic plates of the rotor must be cooled most effectively; (2) the armature winding must be also cooled most effectively; and (3) the shape of the magnetic plates must be square from the standpoint of magnetic efficiency.

First (1), in order to cool the magnetic plates of the rotor most effectively, the outer circumferential portion of the rotor or field core (in particular, in the vicinity of the magnetic plates) must be cooled effectively by forming some axial fan-shaped air passages on the radially inward side of the magnetic paths, while forming a sufficient magnetic path for passing a magnetic flux generated by each magnetic plate. For achieving the above-mentioned two contradictory requirements, it is desirable to form the rotor as a multi-pole structure (i.e., a number of magnet plates 122 are arranged along the outer circumference of the field core 121 as shown in FIG. 12). This is because the radial thickness of the field core (for forming the magnetic paths) can be reduced and further the distance between the two adjacent magnetic poles can be also reduced.

As a result of the study of various multi-pole structures, it has been found that the 14-pole magnetic structure is most preferable to satisfy the above-mentioned conditions.

Secondly (2), in order to cool the armature winding most effectively, cooling air must be blown against the armature winding as broad an area as possible. For doing this, when the thickness of the armature winding at the central portion of the armature core is reduced, since the thickness of the field core is also reduced, the size of the respective magnetic plates is also reduced, with the result that the magnetic flux density of the magnetic field is also reduced. In other words, therefore, it is impossible to increase the number of the magnetic poles excessively.

Here, however, the most preferable results have been obtained when each of the two projecting lengths of the armature winding from both the side surfaces of the stator core (i.e., coil end length of the armature winding from one side of the armature core) is determined as the thickness of the stator core. In other words, the thickness of the stator (i.e., armature) core 111 is determined as being about ⅓ of the total length of the armature winding 112 (in the axial direction of the core), and the stator core is located at the axially middle portion of the armature winding, as shown in FIG. 11.

Lastly (3), in order to form the magnetic plates into square shape, the number of field magnetic poles must be selected appropriately. This is because the outer diameter of the welding generator is determined preferable as the same outer diameter of the engine and further the size of the magnets is not reduced excessively.

As the result of various studied structures, it has been proved that when the number of magnetic poles is 14, the outer diameter of the welding generator can be determined roughly the same as that of the engine.

Table below lists these studied results:

TABLE

| POLES | CORE THK | MAG SIZE | COM-PARISON 1 | COM-PARISON 2 |
|---|---|---|---|---|
| | | PROBLEMS | | |
| | A | B | C | D |
| 6 | THICK | LARGE | SMALL COIL | SMALL GEN |
| 8 | ↑ | ↑ | ↑ | ↑ |
| 12 | GOOD | GOOD | GOOD | GOOD |
| 14 | GOOD | GOOD | GOOD | GOOD |
| 16 | GOOD | GOOD | GOOD | GOOD |
| 18 | ↓ | ↓ | ↓ | ↓ |
| 20 | THIN | SMALL | LARGE COIL | LARGE GEN |
| | | PROBLEMS | | |
| | E | F | G | H |

In the table above, POLES implies the number of the magnet poles; CORE THK implies the thickness of the core; MAG SIZE implies the magnet path length and magnet thickness (in the radial direction); COMPARISON 1 implies the comparison in length between the core and the exposed coil; COMPARISON 2 implies the comparison in outer diameter between the generator and the engine. Further, A indicates such problems that the magnets cannot be cooled sufficiently, the rotor cannot be supported in cantilever fashion, and the core is heavy; B indicates such a problem that the area of the cooling air passages is small and thereby the magnets cannot be cooled well; C indicates such a problem that the length of the stator core is long and the coil closed area is large, so that the armature winding cannot be cooled well; D indicates such a problem that the diameter of the generator is small and thereby the axial length thereof is large, so that the dead space increases; E indicates such problems that the rotor core shaft is deformed when pressure fitted, and the centrifugal force is large so that the rotor cannot be supported stably in cantilever fashion; F indicates such a problem that although the cooling air passage area increases, the mechanical strength decreases; G indicates such a problem that the lengths of the coil end increase so that the coil end cannot be fixed and cooled well; and H indicates such a problem that the centrifugal force increases so that the mechanical strength must be increased.

With reference to FIG. 11 again, the housing 101 is formed with a holding portion 101a on the open end surface side thereof to hold the armature core 111. In addition, the housing 101 is formed with some air outlet holes 101b on the outer circumferential surface thereof. On the other hand, the top cover 103 is formed with air inlet holes 103a for introducing air from the side surface thereof remote from the engine and with some air outlet holes 103b on the outer circumferential surface thereof. Therefore, the housing 101 and the top cover 103 construct an enclosure for housing the stator 110 and the rotor 120 therewithin in combination.

Therefore, as shown by arrow curves in FIG. 11, when the rotor 120 rotates, two air passages can be formed from the air inlet holes 103a of the top cover 103 to the air outlet holes 103b of the top cover 103 and to the air outlet holes 101b of the housing 101 by the centrifugal force generated by the centrifugal fan blades 123 formed in the rotor 120. In this case, a cylindrical air introducing portion 103e (See FIGS. 7 and 11) forms the cooling air passage in cooperation with the centrifugal fan blades 123.

Therefore, the stator 110 and the rotor 120 are both cooled by air passing through the above-mentioned two air passages. In this case, the heat generated by the armature winding 112 of the stator 110 is removed by blowing the cooling air against the two portions of the armature winding 112 projecting from the armature core 111. In this case, although not large as compared with the heat generated by the armature winding 112, the heat generated due to the core loss of the armature core 111 can be also removed together. Further, heat conducted from the engine to the field core 121 can be removed by the cooling air flowing along one side surface of the field core 121 (the left side arrow in FIG. 11) and by the cooling air flowing through the axial fan-shaped air passages 121a of the field core 121 and then along the other side surface of the field core 121 (the right side arrow in FIG. 11). As described above, since the temperature rise of the magnet plates 133 arranged on the outer circumferential surface of the field core 121 can be prevented, it is possible to prevent the magnetic characteristics of the magnet plates 122 from being degraded.

In addition to the above-mentioned positive heat removing and cooling methods, the field core 121 is prevented from being heated by the engine, owing to the presence of a plurality of the axial fan-shaped air passages 121a formed in the field core 121. In more detail, since a plurality of the axial fan-shaped air passages 121a are formed in the field core 121; that is, since the cross-sectional area of the field core 121 is reduced along the radial direction thereof, although heat may be conducted from the engine shaft 202 to the inner circumferential portion of the field core 121, it is possible to markedly reduce engine heat conducted from the inner circumferential portion to the outer circumferential portion of the field core 121. Therefore, when the field core 121 formed with a plurality of the axial fan-shaped air passages 121a is cooled by the above-mentioned cooling air effectively, it is possible to prevent the temperature of the outer circumferential portion of the field core 121 from being increased, that is, to effectively prevent the magnet plates form being heated.

FIG. 12 shows the state where the assembly of the rotor 120 of this second embodiment has been almost completed.

In FIG. 12, the core 121 of the rotor 120 is constructed by connecting an inner ring portion with an outer ring portion by the four spokes so as to form four axial fan-shaped air passages 121a. Further, the centrifugal fan blades 123 are formed in the vicinity of the outer circumferential portion of the core 121 on both side surfaces thereof. Further, a plurality of the magnet plates 122 are fitted to the outer circumferential surface of the core 121, and further the fitted magnet plates 122 are fixed by use of resin-impregnated string wound around the outer circumferential surface of the core 121. Further, although not shown in FIG. 12, a number of axially-inward projecting magnet-holding projections are formed integral with the centrifugal fan blades 123 on both sides of the magnet plates 122 and in the outer circumferential surface of the core 121, to support the magnet plates 122. In more detail, three magnet pushing projections are formed to hold each side of each magnet plate 122. Therefore, even if the magnet plates 122 are manufactured within some dimensional tolerance, it is possible to support the magnet plates 122 stably by absorbing the dimensional tolerance of the magnet plates.

Further, as already explained, the core 121 is formed with four spokes so as to form the axial four fan-shaped air passages 121a between the two adjacent spokes. Therefore, when air flow is generated by the centrifugal fan blades 123, air introduced through the central air inlet holes 103a of the top cover 103 in the axial direction thereof can be passed toward the engine side of the rotor 120 through these air passages 121a. As a result, since the core 121 can be cooled by exposing both the side surfaces thereof and the wall surfaces around the four axial fan-shaped air passages 121a thereof to the introduced cooling air, it is possible to cool the entire surfaces of the core 121 uniformly and effectively under excellent conditions.

Figure 13:
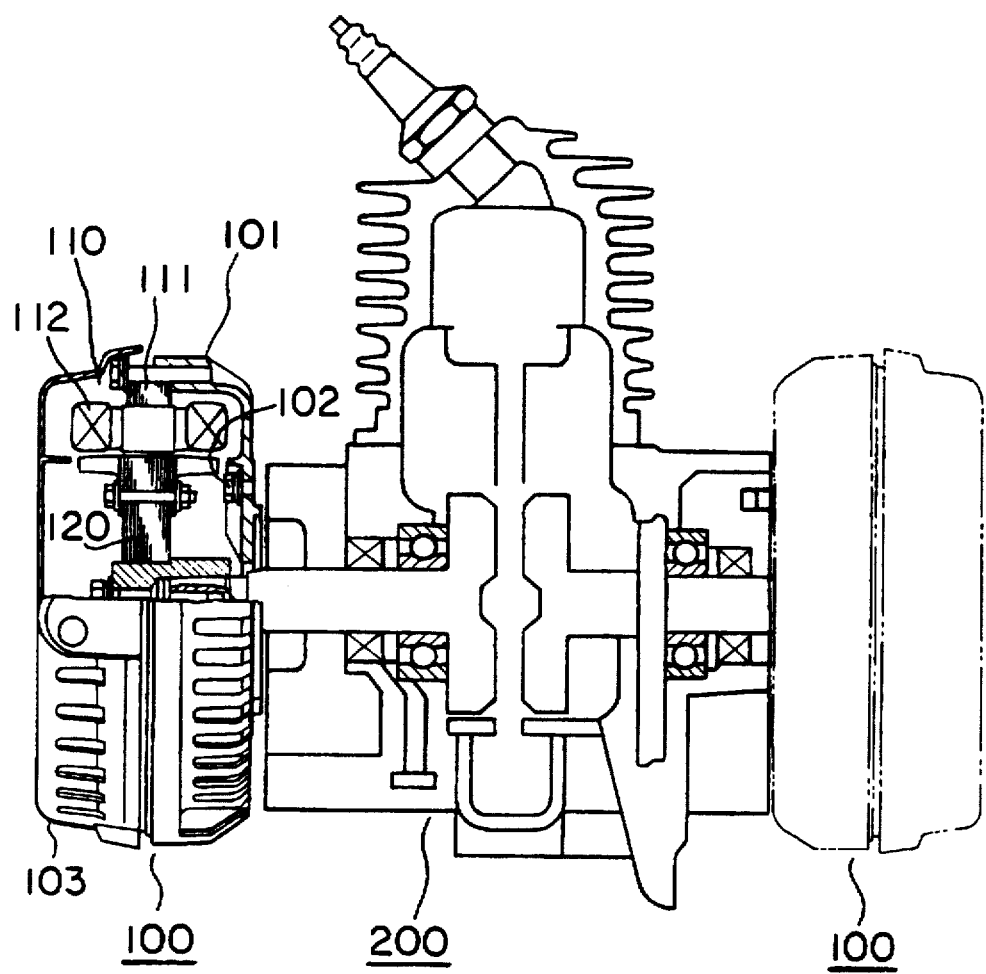
FIG. 13 is an outside view showing the state where two welding generators of the second embodiment shown in FIG. 11 are coupled with an engine.
Figure 16:
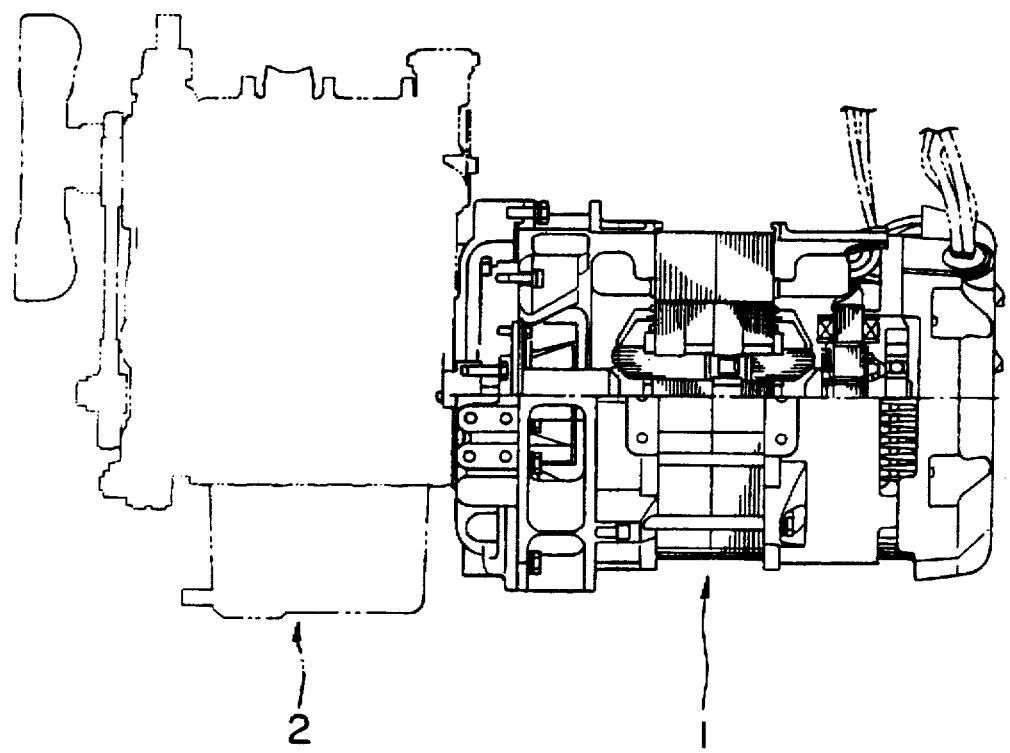
FIG. 16 is an outside view showing a prior art engine-driven welding generator.
Figure 17:
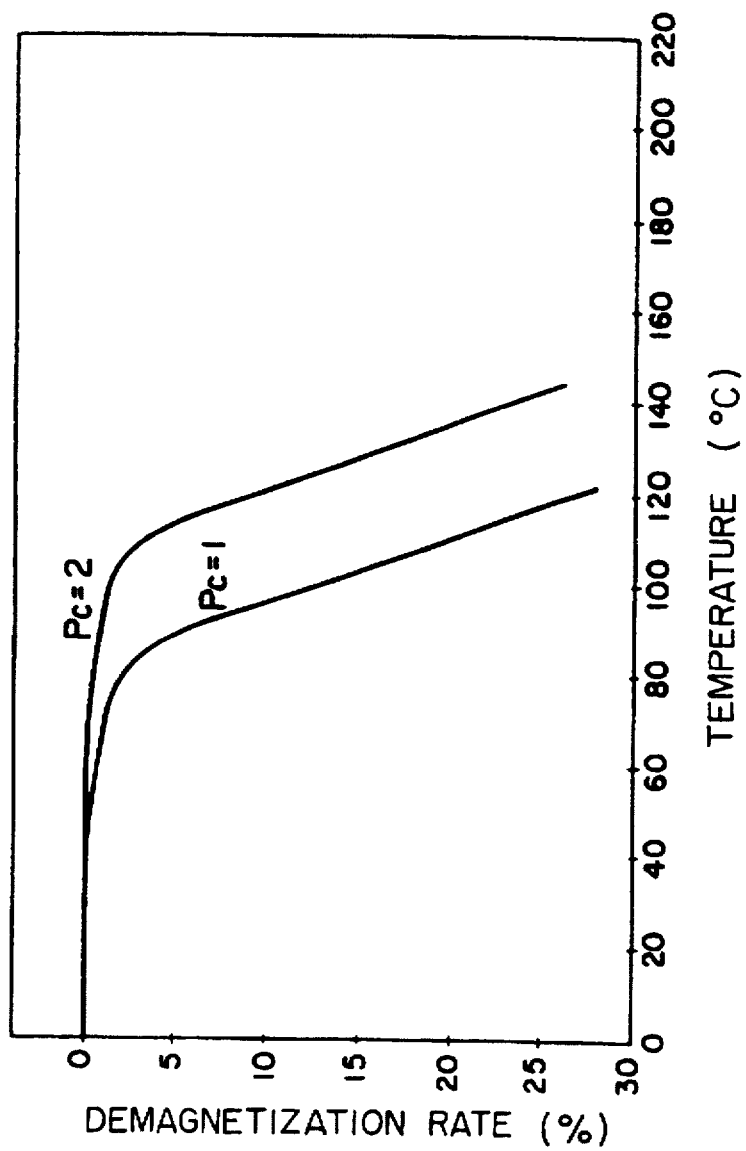
FIG. 17 is a graphical representation showing the temperature-demagnetization characteristics of the neodymium-iron-boron based rare earth magnet (Pc=1), in comparison with those of samarium-cobalt based rare earth magnet (Pc=2).

FIG. 13 shows the state where two engine-driven welding generators 100 according to the present invention are coupled with the engine 200. FIG. 13 indicates that the axial dimension of each engine-driven welding generator 100 is smaller than that of the engine 100, so that the size of the welding generator coupled with the engine can be reduced to that extent. On the other hand, in the prior art engine-driven welding generator 1 as shown in FIG. 16, since the axial length of the welding generator 1 is longer than that of the engine 2, the size of the welding generator 1 coupled with the engine 2 is relatively large.

Figure 14:
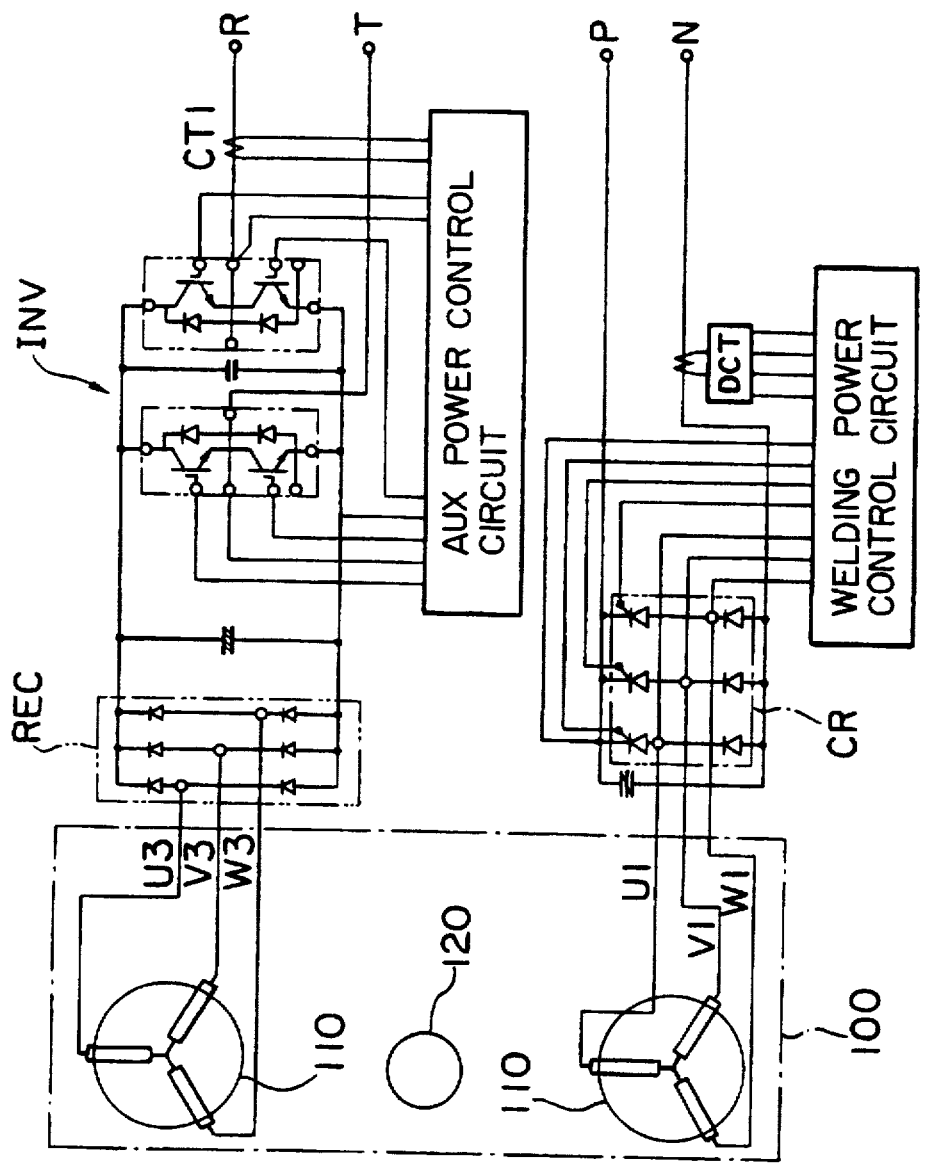
FIG. 14 is a circuit diagram of the welding generator for generating an ac auxiliary power source output, in addition to a dc welding power source output.

FIG. 14 is an electric power output circuit of the welding generator according to the present invention, by which a dc power source for welding and an auxiliary ac power source for the other appliance (e.g., machining or illuminating apparatus) can be generated. To generate the dc welding power, three-phase outputs are first generated by one side of three-phase stator windings 110 of the welding generator 100 in cooperation with the stator 120, and then given to a three-phase control rectifier CR controlled by a welding power controlling circuit through three connection wires U1, V1 and W1, so that an dc power source can be obtained between two output terminals P and N. Further, to generate the auxiliary ac power, three-phase outputs are first generated by the other side of the three-phase stator windings 110 of the welding generator 100 in cooperation with the stator 120, and then given to a three-phase rectifier REC through three connection wires U3, V3 and W3 and further to a transistor inverter INV controlled by an auxiliary power control circuit, so that a single phase ac power source can be obtained between two output terminals R and T. As described above, both the dc power and the single phase ac power can be obtained as the dc welding power and the ac auxiliary power, respectively.

In the generator constructed as described above, when the rotor is rotated and thereby the centrifugal fan blades are rotated, since air ventilation can be made in the radial direction of the rotor, air is introduced into the welding generator through the top cover. In this case, since the introduced air is divided into the air for cooling one side surface of the rotor (remote from the engine) and the air for cooling the other side surface of the rotor (near the engine) after having been passed through the axial fan-shaped air passages of the rotor, and thereafter exhausted to the outside of the generator, it is possible to cool the field core of the rotor and the armature winding of the stator (located on the radially outward side of the rotor) and further the magnet plates arranged on the outer circumferential surface of the field core effectively. As a result, even if the rare earth magnets containing neodymium-iron-boron based rare earth as the major magnet component (whose temperature-demagnetization characteristics are not excellent in comparison with the samarium-cobalt based rare earth magnet) is used as the field system of the generator, it is possible to operate the generator under excellent conditions.

Further, since the welding generator can be formed into a relatively small shape and further supported by the engine shaft in cantilever fashion, when the two welding generators coupled on both axial sides of the engine shaft are driven by a single engine, it is possible to construct a welding generator of relatively large power output easily by synthesizing both the powers generated by the two generators of relatively small power output.

Here, in the construction of the welding generator as shown in FIG. 11, other countermeasures against heat other will be taken into account. As already explained, in the welding generator according to the present invention, the thickness of the armature core 111 and both the coil end lengths of the armature winding 112 projecting from the armature core ends are determined at a ratio of 1:2; that is, about ⅓ length of the armature winding 112 is wound around the winding grooves 111a of the armature core 111 and about ⅔ or more length of the armature winding 112 is exposed from the armature core 11. Consequently, the major part of heat generated by the current flowing through the armature winding 112 can be removed by the cooling air. In this case, although not large as compared with the heat generated by the armature winding 112, the heat generated by the core loss of the armature core 111 can be also removed simultaneously.

On the other hand, the rotor 120 can be cooled by the cooling air flowing along both the side surfaces of the field core 121 and the cooling air flowing through the axial fan-shaped air passages 121a. Therefore, the magnet plates 122 arranged on the outer circumferential surface of the field core 121 can be prevented from being heated, with the result that it is possible to prevent the magnetic characteristics of the magnet plates from deteriorating.

Further, FIG. 15 shows a modification of the axial fan-shaped air passages formed in the field core 121. In this modification, the four axial fan-shaped air passages are formed in such a way that the inner and outer circumferential portions of the field core 121 are linked by the four spokes 121b but separated from each other by the presence of the four axial air passages 121a, respectively. Further, the outer circular arc shaped wall surface portion of each air passage 121a is formed into a zigzag shape 121a so as to form a number of grooves extending in the axial direction thereof, to increase the cooling surface area of the field core 122.

Therefore, although the heat generated by the engine and transmitted through the engine output shaft 202 may be introduced to the inner circumferential portion of the field core 121, it is possible to effectively prevent heat from being conducted to the outer circumferential portion of the field core 121. In addition, since the cooling air introduced into the axial fan-shaped air passages 121a is allowed to flow along the broad zigzag-shaped (groove-form) wall surfaces 121c of the axial fan-shaped air passages 121a, heat can be removed from the field core 121; that is, to cool the field core 121 more effectively. Further, since the wall surface area of each axial fan-shaped air passage 121a can be maximized at the outer circumferential portion thereof, that is, the outermost circular arc portion thereof, it is possible to remove heat conducted to the field core 121 at the outer circumferential portion of the field core 121, so that the circumferential portion of the field core 121 can be cooled effectively. In addition, in FIG. 15, when a number of grooves are formed in the outer circular arc shaped portion of each of the fan-shaped air passages 121a in parallel to or slightly obliquely with respect to the axial direction of the field core 121, since the wall surface area directly brought into contact with the introduced cooling air can be increased, the cooling effect can be further improved. In this case, when each groove depth is increased and further the thickness of the core between the two adjacent grooves is reduced obliquely with respect to the axial direction of the field core (i.e., the both side surfaces of the triangular portion of the field core are chamfered), since the chamfered surfaces of the field core function as fan blades, it is possible to further obtain an axial-flow fan effect.

Further, in this modification as shown in FIG. 15, it is possible to cool both the field core of the rotor and the armature winding of the stator more effectively, by the cooling air first introduced into the housing in cooperation with both the centrifugal fan blades and axial fan-shaped air passages formed in the field core and then divided into one cooling air flowing along one side surface of the field core and the other cooling air flowing along the other side surface of the field core after having been passed through the fan-shaped air passages. In addition, since the field core is formed in such a way that the heat conduction path from the inner circumferential portion to the outer circumferential portion of the field core can be minimized by the fan-shaped air passages, it is possible to effectively prevent heat from being conducted from the engine shaft fixed to the inner circumferential portion of the field core to the magnet plates arranged in the outer circumferential portion thereof.

Further, since the flowing path of the cooling air introduced into the welding generator by the centrifugal fan blades can be controlled by the cylindrical air introducing projection formed in the top cover, it is possible to use the ventilating air effectively as air for cooling air the welding generator.

What is claimed is:

1. An engine-driven permanent magnet type welding generator, which comprises:
   a stator including:
      a laminated armature core; and
      an armature winding wound around the armature core, a coil end of the armature winding from one side of the armature core being long enough to be cooled by ventilated cooling air;
   a rotor including:
      a field core fixed to an engine rotary shaft and supported by an engine in cantilever fashion so as to be located at a central position of the stator, a thickness of the field core being equivalent to that of the armature core, the field core being formed with a cross sectional area effective for field magnet flux in an outer circumferential portion thereof and with a plurality of axial fan-shaped air passages in an inner circumferential portion thereof;

a plurality of magnet plates each formed into a substantially square shape and arranged in line on an outer circumferential surface of the field core, the number of the magnet plates being the same as a number of field poles of the field core; and a plurality of centrifugal fan blades arranged in the vicinity of an outer circumference of and on both side surfaces of the field core, for ventilating cooling air in radial direction of the stator; and an enclosure including:

a housing fixed to the engine, the housing having a faucet portion for supporting the stator, and air outlet holes; and a top cover to be attached to the housing, the top cover having air inlet holes and being formed with a plurality of air passages for introducing cooling air from one side surface of the rotor remote from the engine through the air inlet holes and the fan-shaped air passages formed in the rotor core and the coil end of the armature winding in cooperation with the housing to the air outlet holes.

2. The engine-driven permanent magnet type welding generator of claim 1, wherein the top cover is formed with a cylindrical air introducing portion for regulating air flow path caused by the centrifugal fan blades.

3. The engine-driven welding generator of claim 1, wherein two generators each composed of the stator and the rotor are coupled to the engine on both axial sides of the engine, respectively to generate a power output by synthesizing two power outputs of the two welding generators.

* * * * *